(12) United States Patent
Chowdhury et al.

(10) Patent No.: US 11,507,828 B2
(45) Date of Patent: Nov. 22, 2022

(54) UNSUPERVISED HYPERNYM INDUCTION MACHINE LEARNING

(71) Applicant: International Business Machines Corporation, Armonk, NY (US)

(72) Inventors: Md Faisal Mahbub Chowdhury, Woodside, NY (US); Robert G. Farrell, Cornwall, NY (US); Nicholas Brady Garvan Monath, Northhampton, MA (US); Michael Robert Glass, Bayonne, NJ (US); Md Arafat Sultan, Croton-on-Hudson, NY (US)

(73) Assignee: International Business Machines Corporation, Armonk, NY (US)

( * ) Notice: Subject to any disclaimer, the term of this patent is extended or adjusted under 35 U.S.C. 154(b) by 517 days.

(21) Appl. No.: 16/666,800

(22) Filed: Oct. 29, 2019

(65) Prior Publication Data

US 2021/0125058 A1    Apr. 29, 2021

(51) Int. Cl.
*G06F 40/205* (2020.01)
*G06N 3/08* (2006.01)
(Continued)

(52) U.S. Cl.
CPC ............. *G06N 3/08* (2013.01); *G06F 40/205* (2020.01); *G06K 9/6256* (2013.01); *G06N 5/04* (2013.01)

(58) Field of Classification Search
CPC ................................ G06K 9/6256; G06N 5/04
See application file for complete search history.

(56) References Cited

U.S. PATENT DOCUMENTS 7,546,235 B2 *  6/2009  Brockett ................ G06F 40/30
                                                       704/4
9,235,812 B2 *  1/2016  Scholtes ................ G06N 20/00
(Continued)

OTHER PUBLICATIONS

Rigouts Terryn, A., et al. "Dutch Hypernym Detection: Does Decompounding Help?" In Proceedings of the second joint workshop on language and ontology & terminology and knowledge structures, 2016 (Year: 2016).*

(Continued)

*Primary Examiner* — Jesse S Pullias
(74) *Attorney, Agent, or Firm* — Scully, Scott, Murphy & Presser, P.C.; Anthony R. Curro

(57) ABSTRACT

Training a machine learning model such as a neural network, which can automatically extract a hypernym from unstructured data, is disclosed. A preliminary candidate list of hyponym-hypernym pairs can be parsed from the corpus. A preliminary super-term—sub-term glossary can be generated from the corpus, the preliminary super-term—sub-term glossary containing one or more super-term—sub-term pairs. A super-term—sub-term pair can be filtered from the preliminary super-term—sub-term glossary, responsive to detecting that the super-term—sub-term pair is not a candidate for hyponym-hypernym pair, to generate a final super-term—sub-term glossary. The preliminary candidate list of hyponym-hypernym pairs and the final super-term—sub-term glossary can be combined to generate a final list of hyponym-hypernym pairs. An artificial neural network can be trained using the final list of hyponym-hypernym pairs as a training data set, the artificial neural network trained to identify a hypernym given new text data.

20 Claims, 10 Drawing Sheets

(51) Int. Cl.
*G06K 9/62* (2022.01)
*G06N 5/04* (2006.01)

(56) References Cited

U.S. PATENT DOCUMENTS

| 9,811,849 | B2 | 11/2017 | Bursey | |
|---|---|---|---|---|
| 11,227,128 | B2* | 1/2022 | Min | G06N 3/04 |
| 2006/0217818 | A1* | 9/2006 | Fujiwara | G06N 20/00 |
| | | | | 700/16 |
| 2016/0148096 | A1* | 5/2016 | Bornea | G06N 5/02 |
| | | | | 706/55 |
| 2017/0300839 | A1 | 10/2017 | Bursey | |
| 2017/0308946 | A1 | 10/2017 | Bursey | |
| 2018/0143962 | A1 | 5/2018 | Tremblay et al. | |
| 2018/0189269 | A1* | 7/2018 | Quirk | G06F 40/295 |
| 2018/0336183 | A1* | 11/2018 | Lee | G06N 3/08 |

OTHER PUBLICATIONS

Wang et al. "An Attention-based Bi-GRU-CapsNet Model for Hypernymy Detection between Compound Entities". 2018 IEEE International Conference on Bioinformatics and Biomedicine, Dec. 3-6, 2018 (Year: 2018).*
Panchenko, A., et al., "Improving Hypernym Extraction with Distributional Semantic Classes", arXiv:1711.02918v1, Nov. 2017, 11 pages.
Nguyen, KA., et al., "Hierarchical Embeddings for Hypernymy Detection and Directionality", arXiv:1707 07273v1, Jul. 23, 2017, 11 pages.
Anonymously, "Retrospective User Input Inference and Correction", An IP.com Prior Art Database Technical Disclosure, IP.com No. IPCOM000252365D, Jan. 5, 2018, 38 pages.
Anonymously, "Recognizing Semantic Formatting Information in a Document", An IP.com Prior Art Database Technical Disclosure, IP.com No. IPCOM000251990D, Dec. 13, 2017, 35 pages.
Anonymously, "Semi-Supervised Classification Using Object Metadata", An IP.com Prior Art Database Technical Disclosure, IP.com No. IPCOM000252345D, Jan. 5, 2018, 34 pages.
Anonymously, "Generating Punctuation for Spoken Text", An IP.com Prior Art Database Technical Disclosure, IP.com No. IPCOM000252105D, Dec. 15, 2017, 36 pages.
Lefever, E., "LT3: A Multi-modular Approach to Automatic Taxonomy Construction", Proceedings of the 9th International Workshop on Semantic Evaluation (SemEval 2015), Jun. 4-5, 2015, pp. 944-948.
Panchenko, A., et al., "TAXI at SemEval-2016 Task 13: a Taxonomy Induction Method based on Lexico-Syntactic Patterns, Substrings and Focused Crawling", Proceedings of SemEval-2016, Jun. 16-17, 2016, pp. 1320-1327.
Roller, S., et al., "Hearst Patterns Revisited: Automatic Hypernym Detection from Large Text Corpora", Proceedings of the 56th Annual Meeting of the Association for Computational Linguistics (Short Papers), Jul. 15-20, 2018, pp. 358-363.
Shwartz, V., et al., "Hypernyms under Siege: Linguistically-motivated Artillery for Hypernymy Detection", Proceedings of the 15th Conference of the European Chapter of the Association for Computational Linguistics, Apr. 3-7, 2017, pp. 65-75, vol. 1, Long Papers.
Snow, R., "Learning syntactic patterns for automatic hypernym discovery", Advances in Neural Information Processing Systems, Nov. 2004, 8 pages.
Hearst, M.A., "Automatic Acquisition of Hyponyms from Large Text Corpora", Proc. of Coling-92, Aug. 23-28, 1992, pp. 539-545.
Li, X., et al., "PhraseNet: Towards Context Sensitive Lexical Semantics", CONLL '03 Proceedings of the Seventh Conference on Natural Language Learning at HLT-NAACL 2003, May 31-Jun. 1, 2003, pp. 87-94.
Miller, G.A., "WordNet: A Lexical Database for English", Communications of the ACM, Nov. 1995, pp. 39-41, vol. 38, No. 11.
Soergel, D., "WordNet: An Electronic Lexical Database", Cambridge, MA: MIT Press, 1998, ed., Oct. 1998, Abstract only, 8 pages.
Ritter, A ., et al., "What Is This, Anyway: Automatic Hypernym Discovery", AAAI 2009, Jan. 2009, pp. 88-93.
Zhang, Z., et al., "SJTU-NLP at SemEval-2018 Task 9:Neural Hypernym Discovery with Term Embeddings", Proceedings of the 12th International Workshop on Semantic Evaluation (SemEval-2018), Jun. 5-6, 2018, pp. 903-908.
Rodriguez, I., "Learning hypernymy in distributed word vectors via a stacked LSTM network", https://web.stanford.edu/class/cs224d/reports/Rodriguez.pdf, Jun. 4, 2016, 12 pages.
Tsujimura, T., "TTI-COIN at SemEval-2017 Task 10: Investigating Embeddings for End-to-End Relation Extraction from Scientific Papers", Proceedings of the 11th International Workshop on Semantic Evaluations (Sem-Eval 2017), Aug. 3-4, 2017, pp. 985-989.
NIST, "NIST Cloud Computing Program", http://csrc.nist.gov/groups/SNS/cloud-computing/index.html, Created Dec. 1, 2016, Updated Oct. 6, 2017, 9 pages.

* cited by examiner

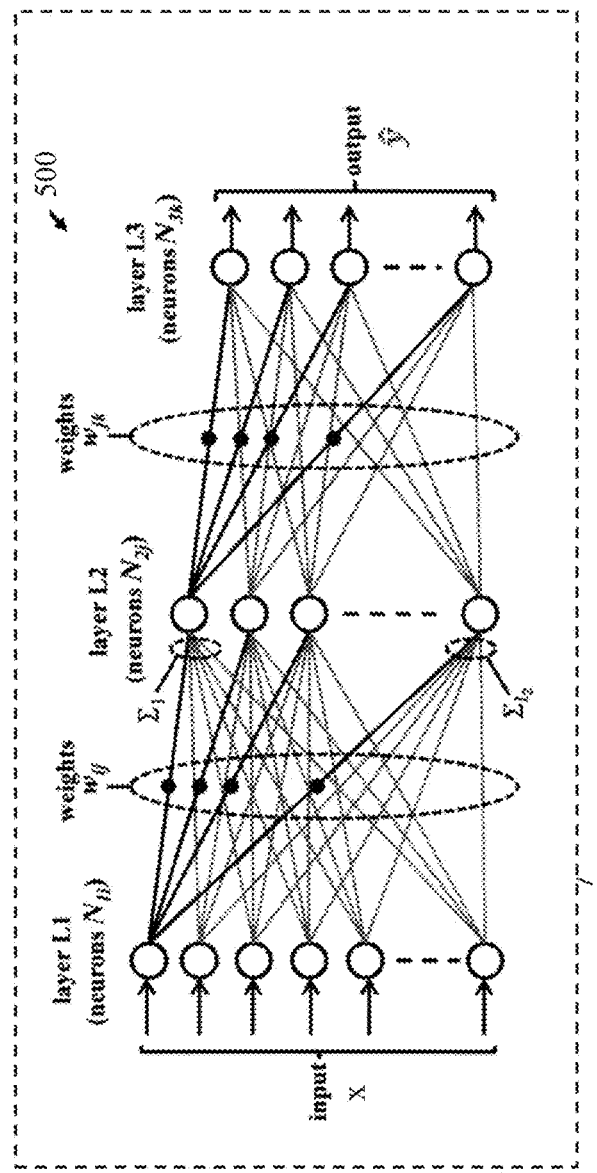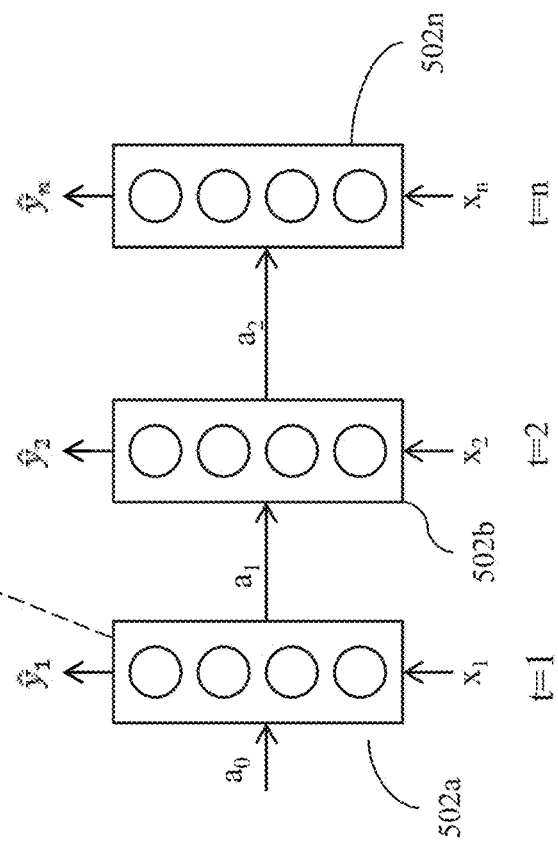
FIG. 5

UNSUPERVISED HYPERNYM INDUCTION MACHINE LEARNING

BACKGROUND

The present application relates generally to computers and computer applications, and more particularly to machine learning and unsupervised hypernym induction.

In linguistics, hypernyms refer to a word with a broad meaning under which words with more specific meaning or meanings (referred to as hyponyms) can fall. For example, "color" is a hypernym of "purple", the word "purple" being a hyponym of "color". Another example of a hypernym-hyponym pair is "cutlery"-"spoon".

Given sufficient amount of training data, supervised machine learning systems can be trained to predict hypernyms. However, training data is not available equally in all domains. While manually constructed Hypernym databases may exist, building such databases manually can be a costly task. Some approaches to determining hypernyms are based on lexico-syntactic patterns. Such patterns are sparse and require exact word sequences.

A support vector machine (SVM) based supervised system to identify hypernym relations finds that frequency in the corpus is the best indicator of hypernym frequency. That system, however, does not handle phrases, and instead focuses on single words.

Recent studies have explored distributional inclusion using vectors of adjacent words, part-of-speech (POS) tags and dependency parses of contexts. A literature found that lexico-syntactic patterns capture contextual constraints not covered by distributional inclusion approaches. Yet another work uses a simple substring matching.

BRIEF SUMMARY

A computer-implemented method and system for hypernym induction can be provided. The method, in one aspect, can include receiving a corpus of electronic text. The method can also include parsing a preliminary candidate list of hyponym-hypernym pairs from the corpus. The method can further include generating a preliminary super-term—sub-term glossary from the corpus, the preliminary super-term—sub-term glossary containing one or more super-term—sub-term pairs. The method can also include filtering out a super-term—sub-term pair from the preliminary super-term—sub-term glossary, responsive to detecting that the super-term—sub-term pair is not a candidate for hyponym-hypernym pair, to generate a final super-term—sub-term glossary. The method can also include combining the preliminary candidate list of hyponym-hypernym pairs and the final super-term—sub-term glossary to generate a final list of hyponym-hypernym pairs. The method can further include training an artificial neural network using the final list of hyponym-hypernym pairs as a training data set, the artificial neural network trained to identify a hypernym given a new electronic text.

A system for hypernym induction can include a hardware processor and a memory device coupled with the hardware processor. The hardware processor can be configured to receive a corpus of electronic text. The hardware processor can also be configured to parse a preliminary candidate list of hyponym-hypernym pairs from the corpus. The hardware processor can also be configured to generate a preliminary super-term—sub-term glossary from the corpus, the preliminary super-term—sub-term glossary containing one or more super-term—sub-term pairs. The hardware processor can also be configured to filter out a super-term—sub-term pair from the preliminary super-term—sub-term glossary, responsive to detecting that the super-term—sub-term pair is not a candidate for hyponym-hypernym pair, to generate a final super-term—sub-term glossary. The hardware processor can also be configured to combine the preliminary candidate list of hyponym-hypernym pairs and the final super-term—sub-term glossary to generate a final list of hyponym-hypernym pairs. The hardware processor can also be configured to train an artificial neural network using the final list of hyponym-hypernym pairs as a training data set, the artificial neural network trained to identify a hypernym given a new electronic text.

A computer readable storage medium storing a program of instructions executable by a machine to perform one or more methods described herein also may be provided.

Further features as well as the structure and operation of various embodiments are described in detail below with reference to the accompanying drawings. In the drawings, like reference numbers indicate identical or functionally similar elements.

BRIEF DESCRIPTION OF THE DRAWINGS

FIG. 5 is an example model, a sequence-to-sequence artificial neural network such as a recurrent neural network or LSTM, which can be trained based on training data set.

DETAILED DESCRIPTION

Figure 1:
FIG. 1 is a diagram illustrating a method of training a neural network, which can automatically extract hypernym and/or hyponym from unstructured text, in an embodiment.

Hypernym detection finds, from a text corpus, pairs of terms (e.g., words or multi-word expressions) that are in a hypernym relation. A capability to efficiently identify hypernyms or hypernym-hyponym pairs (e.g., "is a" relationship) can improve many computer-implemented tasks such as search engine tasks, question and answering system tasks, and others.

Systems, methods and/or techniques may be provided, which can perform automatic extraction of hypernyms, hyponyms, and/or hypernym-hyponym pairs from unstructured free text without any supervision. Automatically extracting a hypernym from free text can facilitate many computer-implemented tasks such as, but not limited to, automatically being able to generate broader or narrower search terms for search engines, to find general or narrower categories of answers or questions in question answering systems (e.g., in answering questions), to build taxonomies, ontologies and/or knowledge base constructions, and to aid in other data mining techniques. In an embodiment, an overall approach is unsupervised, for example, it does not require manually annotated hyponym-hypernym pairs inside the given corpus text. The overall approach can work with an unannotated corpus text. In an embodiment, the overall approach creates training data in unsupervised way without any manual annotation, for example, for training a machine learning model such as a neural network model.

In an embodiment, a system, method and/or technique (referred to herein as a methodology or approach for simplicity of explanation), may implement an unsupervised machine learning approach for automatic hypernym extraction that exploits structured index of super-terms and/or sub-terms. A super-term is a term that contains another term, e.g., president of the united states" is a super-term of "president" and "united states". Here, "president" and "united states" are corresponding sub-terms (also referred to as, "nested terms") of their super-term. In an embodiment, this index allows to identify new hypernyms and/or hypernym-hyponym pairs that pattern based approaches or simple substring matching cannot.

By using various statistical and linguistic evidences and/or rule-based inferences from the corpus of text, the methodology in an embodiment can identify and decide to ignore super-term—sub-term pairs that are not necessarily hypernym-hyponym, for example, filter incorrect hypernym-hyponym pairs.

In an embodiment, the methodology may learn a hypernym sub-term from a hyponym super-term by encoding a sequence of text tokens expressing the hypernym-hyponym relationship and decoding the sequence as a hypernym-hyponym pair using a neural network to learn a model that can perform this sequence-to-sequence task. For example, the methodology may learn which super-terms can be a hypernym for the corresponding hyponym using a sequence-to-sequence model.

In an embodiment, the methodology may use transitive closure together with statistical filtering to infer new hypernyms and/or hypernym-hyponym pairs from the corpus that appear not necessarily in the same sentence or even same document. In this embodiment, for instance, a hypernym and a hyponym of a pair need not occur in the same sentence or same document.

While machine learning based models for hypernyms consider multi-word phrases as atomic units and do not consider the structure of the phrase, an embodiment of the methodology described herein parameterizes the model at the word level and uses a neural network architecture to encode and compare the structure of the phrases.

FIG. 1 is a diagram illustrating a method of training a neural network, which can automatically extract hypernym and/or hyponym from unstructured text in an embodiment. The method can be performed by one or more hardware processors or a computing device. A processor, for example, may be a central processing unit (CPU), a graphics processing unit (GPU), a field programmable gate array (FPGA), an application specific integrated circuit (ASIC), another suitable processing component or device, or one or more combinations thereof. The processor may be coupled with a memory device. The memory device may include random access memory (RAM), read-only memory (ROM) or another memory device, and may store data and/or processor instructions for implementing various functionalities associated with the methods and/or systems described herein. The processor may execute computer instructions stored in the memory or received from another computer device or medium.

For example, a processor may perform the method, based on receiving input which may include a corpus of text in electronic form. Such corpus of text may be input via a user interface and/or retrieved from a computer readable storage device. At 102, the method includes extracting a list of candidate hyponym-hypernym pairs from a corpus of unstructured text using linguistic patterns. Linguistic pattern recognition techniques and natural language processing techniques can be used to extract a candidate list. For example, the text can be parsed to identify tokens and words and hypernym-hyponym pairs identified. For explanation purposes only, this list is referred to as List A. List A contains candidate hyponym-hypernym or hypernym-hyponym pairs identified from free text. An example of a hyponym-hypernym pair can be <Jane Doe=> Vice President of United States). In reverse, hypernym-hyponym pair can be <Vice President of United States=> Jane Doe>. While the description herein uses terminology "hypernym-hyponym" pair, the methodology can apply equally to "hyponym-hypernym" pair.

The method also includes filtering out spurious pairs from the candidate list (e.g., List A) using various statistical significance, circumstantial or linguistic evidences and/or rule-based inference. For instance, based on linguistic analysis and/or predefined rules, some pairs can be filtered. Examples of filtering techniques are described in detail below.

An example of initial hypernym-hyponym pairs identified from unstructured text can look like:

| | |
|---|---|
| environment | social_issue |
| environment | issue |
| immigration_reform | social_issue |
| immigration_reform | political_issue |
| political_issue | social_issue |
| immigration_reform | reform |
| immigration | issue |
| vice_president_of_united_states | human |
| Doe | president |

At 104, the method includes constructing a super-term and sub-term glossary from the corpus of unstructured text. A super-term is a term that contains another term, e.g., president of the unites states" is a super-term of "president" and "united states". Here, "president" and "united states" are corresponding sub-terms (also referred to as, "nested terms") of their super-term. For explanation purposes only, this glossary is also referred to as index Z. For example, a super-term/sub-term index can be constructed using noun phrases (NPs) extracted from the corpus. The index may also contain the number of sentences, if any, in the corpus where both a sub-term and a super-term appear. In an aspect, by construction, all terms in index Z are valid terms.

An example index may look like:

| Super term | Sub term(s) |
|---|---|
| social_issue | issue |
| immigration_reform | immigration_reform |

-continued

| Super term | Sub term(s) |
|---|---|
| political_issue | issue |
| vice_president_of_united_states | president |

At 106, the method includes identifying super-term—sub-term pairs, which cannot be potential candidates for hypernym-hyponym pairs. For instance, one or more corpus statistics, linguistics constraints, POS tags and circumstantial evidences can be used to identify super-term—sub-term pairs, which cannot be potential candidates for hypernym-hyponym pairs. Those identified super-term—sub-term pairs are removed from the glossary (index Z). From the remaining super-term—sub-term pairs in the glossary (index Z), the method includes identifying hypernym-hyponym pairs that are already in List A, and removing them from the glossary (index Z). The method further includes adding the remaining pairs from the glossary (index Z) to List A. So, for example, the super-term—sub-term pairs in the glossary, without those identified as not potential candidates, and those not already in List A, are added to List A.

Considering the above examples of initial hypernym-hyponym pairs and index, an example filtered candidate list (e.g., List A) may look like:

| | |
|---|---|
| environment | social_issue |
| environment | issue |
| immigration_reform | social_issue |
| immigration_reform | political_issue |
| political_issue | social_issue |
| immigration_reform | reform |
| immigration | issue |
| vice_president_of_united_states | human |
| Doe | president |
| social_issue | issue |
| political_issue | issue |

At 108, the method includes inferring more hypernym-hyponym pairs using transitive closure on the candidate pairs in List A. The newly inferred pairs are also added to List A. In an embodiment, the validity of these pairs can be checked. For instance, such validity can be determined based on the same methodology used above at 102 to filter out spurious pairs. For instance, using transitive closure on pairs in List A, a hypernym pair ("immigration_reform", "issue") can be inferred from the relations that "immigration_reform"=>"social issue"=>"political_issue"=>"issue". Therefore, the candidate list (e.g., List A) may further look like:

| | |
|---|---|
| environment | social_issue |
| environment | issue |
| immigration_reform | social_issue |
| immigration_reform | political_issue |
| political_issue | social_issue |
| immigration_reform | reform |
| immigration | issue |
| vice_president_of_united_states | human |
| Doe | president |
| social_issue | issue |
| political_issue | issue |
| immigration_reform | issue |

At 110, the method includes training a neural network model such as a long short term memory (LSTM) model using the List A to learn a hypernym sub-term from a hyponym super-term. The method may include applying the model to all noun phrases (NPs) extracted from the corpus to infer new pairs that are not already in List A. List A can be updated. For example, the newly inferred hypernym-hyponym pairs are added to List A.

At 112, the method includes training a deep learning based hypernym extraction system using List A, for example, using matrix factorization. For example, a deep learning neural network model can be trained using List A as a training data set. The method includes parameterizing the model at the word level and using neural network architecture to encode and compare the structure of the phrases.

At 114, the method may further include running the trained deep learning based hypernym extraction system in an inferencing phase to identify or locate a hypernym and/or hyponym in a given new text.

The following describes an embodiment of a filtering technique, for example, which can be used to filter out spurious pairs, for example, at 102 and also at 108. One or more of a plurality of checking techniques can be performed for filtering. For instance, an "orthographic containment checking" technique can include the following logic. If two terms (e.g., "Corporation" and "ABC Corporation") have hypernym relation and one is a sub-term of another, then the hypernym must be the sub-term and the hyponym must be the super-term. For example, "Corporation" (sub-term) is a hypernym of "ABC Corporation" (super-term), and not the other way.

Another checking technique is referred to as "less likely hypernym checking". For instance, a "less likely hypernym checking" can include the following logic. If a term (e.g., "Country C") has a hypernym (e.g., "State") that is sub-term of at least two more other hypernyms (e.g., "Y State", "W Y State", "Regional State", "Home State"), then the method may filter any of those other hypernyms that have less pair frequency than the mean pair frequency of List A.

Yet another checking technique is referred to as "ambiguous co-hypernym checking". For instance, an ambiguous co-hypernym checking can include the following logic. If a term (e.g., Stock Exchange) has hyponyms X (e.g., London Stock Exchange) and Y (e.g., London) where Y is a sub-term of X and Y is not syntactic head of X, remove Y.

Still another checking technique is referred to as "hypernym cycle checking". For instance, a hypernym cycle checking can include the following logic. If X:is-a:Y and Y:is-a:Z, then Z:NOT-is-a:X.

Still yet another checking technique is referred to as "potential proper noun checking". For instance, a potential proper noun checking can include the following logic. Proper nouns (such as human names) cannot be types or hypernyms. The methodology in one embodiment can implement the following heuristic to check proper nouns. A term X1 would be considered as a proper noun if all the following three conditions hold: 1) X1 is not a sub-string of any hypernym X2 (in the list of automatically extracted hypernym-hyponym pairs) and vice-versa; 2) X1:is-a:X2, that is, X2 is hypernym of X1; 3) X2 belongs to a list of hypernyms (e.g., "person", "place", "organization", "name", etc.) that are known to have massive amount of proper noun hyponyms/instances. "Massive amount" can be quantified as a predefined threshold number. If X1 is identified as a proper noun, all pairs where X1 is hypernym is discarded.

The following illustrates learning hypernym relation from super-terms and sub-terms. In an embodiment, creating a hypernym sub-term from a super-term can be seen as a sequence-to-sequence task. In an embodiment, a neural network can be implemented for sequence to sequence learning. For instance, an LSTM can be used over the source sequence to produce a vector, which is then used by another LSTM to create the output sequence. Including or excluding words from the sub-term can be considered as a sequence tagging task.

Noun phrases vary in their internal lexical function structure. Consider the following examples.
Example 1.
Combustion of hydrocarbon:is-a:oxidation process;
And combustion:is-a:process;
But, hydrocarbon:NOT is-a:process.
Example 2.
Housing cooperative:is-a:form of home ownership;
And housing cooperative:NOT is-a:form;
But, housing cooperative:is-a:home ownership.
Example 3.
Silesia:is-a:region of Poland;
And Silesia:is-a:region;
But, Silesia:NOT is-a:Poland.

Function words (e.g., of, in, at, from, etc.) help indicate the position of the hypernym term relative to these function words within noun phrases. In an embodiment, a sequence-to-sequence model such as an LSTM model can be built and trained to learn hypernym relation from super-terms and sub-terms.

Figure 2:
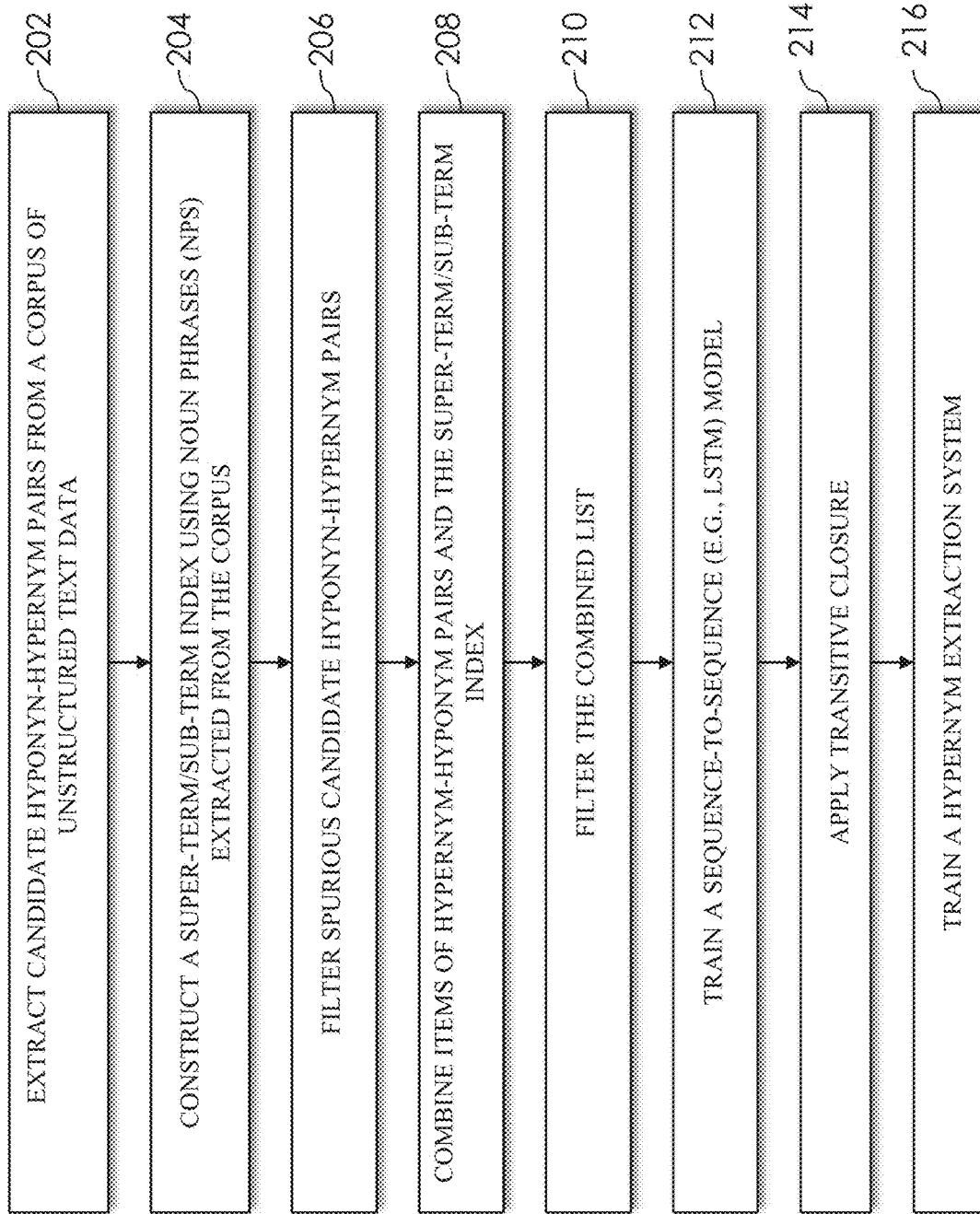
FIG. 2 is another flow diagram illustrating a method of training a neural network to identify a hypernym present in a text document, in an embodiment.

FIG. 2 is a flow diagram illustrating a method of training a neural network to identify a hypernym present in an electronic text, in one embodiment. The method can be performed by one or more hardware processors or a computing device. At 202, the method may include extracting a list of candidate hyponym-hypernym pairs from a corpus of unstructured text data using linguistic patterns. This list is referred to as List A, for explanation purposes herein. Similar technique used in 102 in FIG. 1 can be used to extract the candidate hyponym-hypernym pairs.

An example of initial hypernym-hyponym pairs identified from unstructured text can look like:

| | |
|---|---|
| environment | social_issue |
| environment | issue |
| immigration_reform | social_issue |
| immigration_reform | political_issue |
| political_issue | social_issue |
| immigration_reform | reform |
| immigration | issue |
| vice_president_of_united_states | human |
| Doe | president |

At 204, the method may include constructing a super-term/sub-term index using noun phrases (NPs) extracted from the corpus. Similar technique used in 104 in FIG. 1 can be used to construct the index.

An example index may look like:

| Super term | Sub term(s) |
|---|---|
| social_issue | issue |
| immigration_reform | immigration, reform |
| political_issue | issue |
| vice_president_of_united_states | president |

At 206, statistical significance, linguistic evidences and/or rule-based inference techniques can be used to filter out spurious pairs from List A. Similar filtering technique describes above with reference to FIG. 1 at 102 can be used. For purposes of explanation, this list is referred to as List AR. List AR contains remaining hypernym-hyponym pairs, i.e., without the spurious pairs which are filtered.

The processing at 208 and 210 further filter items in index Z and combine items of index Z and List A to filter and extract hypernym-hyponym pairs. For instance, at 208, another candidate list referred to as List B (for explanation purposes only), is constructed which combines (e.g., selectively combines) items of index Z and List AR. For example, let List B be an empty set. For each hypernym H in List AR, the method includes finding a super-term of H from Index Z. Let S be a corresponding super-term of H in Index Z. If H is not a syntactic head of S, the method ignore it (hypernym H). For example, "Vice President" is syntactic head of "Vice President of United States" but "President" is not syntactic head of "Vice President of United States". If H (hypernym in List AR) and S (corresponding super-term of H in Index Z) appear together in at least one sentence, the method ignores it (hypernym H). Otherwise, the method adds the pair (a super-term—sub-term pair in Index Z) as a candidate hypernym-hyponym pair in List B.

At 210, for each pair in List B, the method includes checking whether the pair cannot be a potential candidate for hypernym-hyponym, for example, by using similar filtering technique described above with reference to FIG. 1 at 102. If it is determined the pair cannot be a potential candidate, the pair is removed from List B. For explanation purposes, the list of remaining pairs is referred to as List C. The method also includes removing any pair in List C that is already in List AR. The method further includes adding the remaining pairs in List C to List AR. This updated list of AR is referred to as List ARX, for explanation purposes.

Considering the above examples of initial hypernym-hyponym pairs and index, an example filtered and combined candidate list (e.g., List ARX) may look like:

| | |
|---|---|
| environment | social_issue |
| environment | issue |
| immigration_reform | social_issue |
| immigration_reform | political_issue |
| political_issue | social_issue |
| immigration_reform | reform |
| immigration | issue |
| vice_president_of_united_states | human |
| Doe | president |
| social_issue | issue |
| political_issue | issue |

At 212, the method includes training a sequence-to-sequence (e.g., LSTM) model using List ARX to learn a hypernym sub-term from a hyponym super-term. An example of a sub-term that is a hypernym can be the following: 'car' is a sub-term of 'police car', and is also a hypernym. In an embodiment, the method may apply the model to all sub-term super-term pairs in Index Z that are not in List ARX and which do not violate checking or filtering, for example, used at 206.

At 214, the method includes applying transitive closure on the pairs in List ARX to infer more hyponym-hypernym pairs. The inferred pairs can be checked for validity using the technique of 206. If valid, the inferred pair or pairs are added to List ARX.

At 216, the method includes training a hypernym extraction system using List ARX. For example, the method parameterizes the models at the word level and uses neural network architectures to encode and compare the structure of the phrases utilizing position relative to function words.

The trained system can be run to identify one or more hypernyms in newly given text, e.g., previously unseen.

Figure 3:
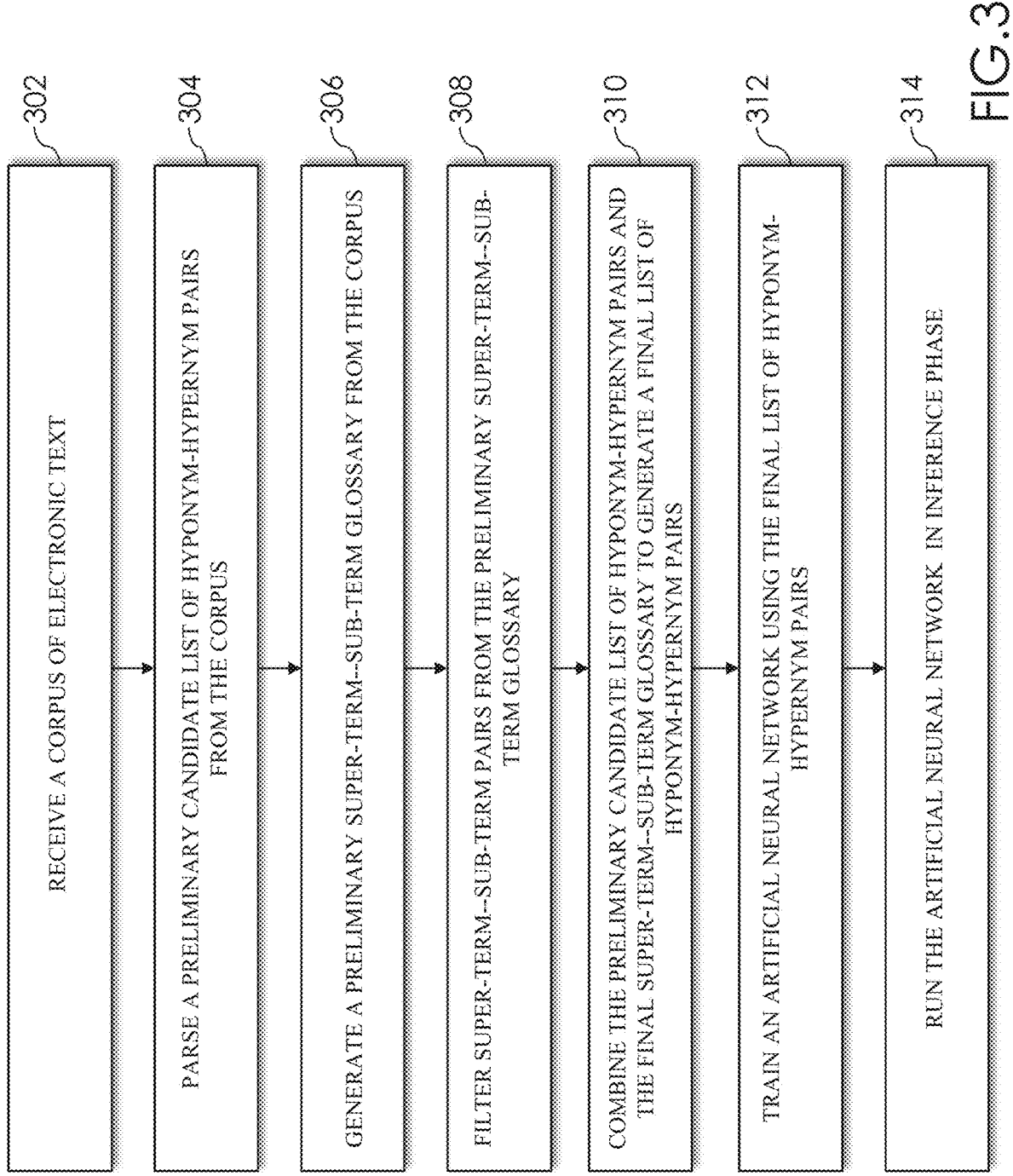
FIG. 3 is another flow diagram illustrating a method of training a neural network, which can identify a hypernym present in an electronic text, in one embodiment.

FIG. 3 is a flow diagram illustrating a method of training an artificial neural network to determine hypernyms present in an electronic text and automatically identifying or extracting a hypernym given an unseen unstructured text, in an embodiment. The method can be performed by one or more hardware processors, or for example, a computing device, which may include one or more hardware processors. At 302, the method may include receiving a corpus of electronic text. For instance, the corpus of electronic text can be stored in a storage device and retrieved from the storage device. As another example, the corpus of electronic text can be received from a remote device via a computer network. Yet as another example, the corpus of electronic text can be input via a user interface, and received from a user interface component.

At 304, the method may include parsing a preliminary candidate list of hyponym-hypernym pairs from the corpus. Natural language processing and/or linguistic pattern matching techniques can be used to parse the corpus and identify the preliminary candidate list of hyponym-hypernym pairs.

At 306, the method may include generating a preliminary super-term—sub-term glossary from the corpus containing one or more super-term—sub-term pairs. Natural language processing and/or linguistic pattern matching techniques can be used to generate the preliminary super-term—sub-term glossary from the corpus containing one or more super-term—sub-term pairs.

At 308, the method may include removing or filtering out super-term—sub-term pairs from the preliminary super-term—sub-term glossary which cannot be hyponym-hypernym pairs to generate a final super-term—sub-term glossary. For example, one or more filtering techniques can be used to filter out the super-term—sub-term pairs which cannot be hyponym-hypernym pairs.

At 310, the method may include combining, for example, selectively, the preliminary candidate list of hyponym-hypernym pairs and the final super-term—sub-term glossary to generate a final list of hyponym-hypernym pairs.

In an embodiment, the processing at 308 and 310 may include similar processing performed at 208 and 210 in FIG. 2, for example, for filtering and combining the super-term—sub-term glossary and hypernym-hyponym pair list.

In an embodiment, a sequence-to-sequence artificial neural network such as an LSTM can be trained using the final list of hyponym-hypernym pairs as a training data set to learn a hypernym sub-term from a hyponym super-term. For example, all noun phrases (NPs) extracted from the corpus can be applied to the LSTM model (run the LSTM model with noun phrases as input) to infer new hypernym-hyponym pairs that are not already in the final list. The final list of hyponym-hypernym pairs can be updated with addition of the newly inferred hyponym-hypernym pairs.

At 312, the method may include training an artificial neural network using the final list of hyponym-hypernym pairs as a training data set to learn to identify a hypernym from a given text data.

At 314, the method may include running the artificial neural network in inference phase to identify one or more hypernyms in a new electronic text. In an embodiment, the artificial neural network can receive as input a term, and the artificial neural network may select one or more sub-terms that are hypernyms appearing in the input term. The artificial neural network can also conclude that there is no hypernym that can be predicted from an input terms.

Figure 4:
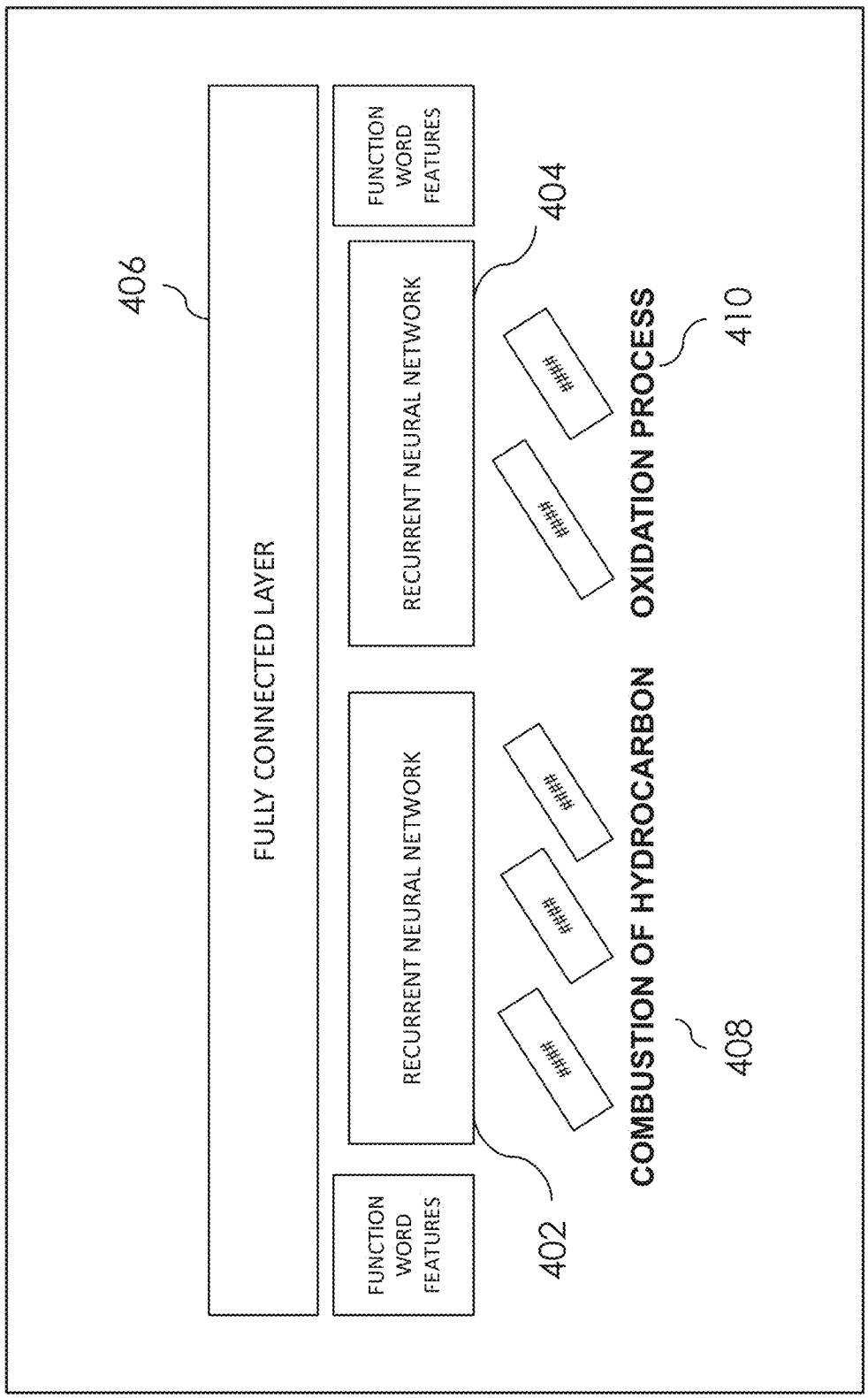
FIG. 4 shows a schematic of a neural network that can identify a hypernym in given input text in one embodiment.

Hypernym detection model training, for example at 112 (FIG. 1), 208 (FIG. 2), and/or 312 (FIG. 3) can include the following. Given hypernym-hyponym pairs, a model is trained to generalize and make predictions about unseen pairs. Training data, for example, includes the list, which can be generated at 110 (FIG. 1), 212, 214 (FIG. 2) and/or 310 (FIG. 3). In an embodiment, further transitive closure processing may be performed to infer additional list. By way of example, consider training data including the following:
Combustion of hydrocarbon:is-a:oxidation process
Combustion:is-a:process
Environment:is-a:social_issue In an embodiment, a binary classifier can be trained to predict hypernym relationship. FIG. 4 illustrates an overview of a binary classifier in one embodiment. For instance, the processing at any of 112 in FIG. 1, 208 in FIG. 2, and 312 in FIG. 3 can build such a binary classifier. The classifier can include one or more recurrent neural networks 402, 404 coupled to a fully connected layer 406. The recurrent neural networks 402, 404 can each process an input phrase, for example, 408, 410. In an embodiment, the fully connected layer 406 can be replaced with attention or any number of alternative architectures.

FIG. 5 is an example model, a sequence-to-sequence artificial neural network such as a recurrent neural network or LSTM, which can be trained based on training data set. The training data set can include the list of candidate hypernym-hyponym pairs, for example, List A described with reference to FIG. 1, List ARX described with reference to FIG. 2, the final list of hyponym-hypernym pairs described with reference to FIG. 3. In an embodiment, the training data is generated in unsupervised way without requiring any manual annotation.

An embodiment of an implementation of an artificial neural network 500 can include a succession of layers of neurons, which are interconnected so that output signals of neurons in one layer are weighted and transmitted to neurons in the next layer. A neuron Ni in a given layer may be connected to one or more neurons Nj in the next layer, and different weights wij can be associated with each neuron-neuron connection Ni-Nj for weighting signals transmitted from Ni to Nj. A neuron Nj generates output signals dependent on its accumulated inputs, and weighted signals can be propagated over successive layers of the network from an input to an output neuron layer. An artificial neural network machine learning model can undergo a training phase in which the sets of weights associated with respective neuron layers are determined. The network is exposed to a set of training data, in an iterative training scheme in which the weights are repeatedly updated as the network "learns" from the training data. The resulting trained model, with weights defined via the training operation, can be applied to perform a task based on new data.

An example of the neural network model is a recurrent neural network model, which can handle time series data or sequence based-data such as sentences or phrases (multiple words) in a language. A recurrent neural network model can have a series of neural network cells $502a$, $502b$, $502n$, which take as input a word in a sentence and also activation information from the previous neural network in the previous time step. For example, copies of neural network are made over time with different inputs at different time steps. The copies of neural network can share weights over time. The neural network at $502b$ can take both the input word (e.g., x2) at that time step (e.g., t=2) and activation information from the previous neural network at the previous time step (e.g., t=1), to predict the next word, e.g., its output y^_2. For example, the activation value a1 from time step 1 is passed onto time step 2. The neural network 502b at time step 2 uses both the activation value and input word to predict the next word. Similarly, at time step n, the neural network the next word in a given sentence is received along with the activation value a2 computed at the previous time step to predict its output (next word). At each time step, the recurrent neural network passes on its activation to the next time step for use. Thus, at the current step, both the input word for that step and information from previous words in the sentence can be used to predict the next word. In the figure, a0 can be an initial activation vector, which can be initialized to zeros or other initial values.

The architecture shown in FIG. 5 is only an example of a neural network, an example of a recurrent neural network model, e.g., a Long Short-Term Memory (LSTM), which can be used to learn the position of the hypernym term relative to function words within noun phrases and thus help to identify a hypernym. LSTMs help retain the error that can be backpropagated through time and layers and learn over time steps. LSTMs contain information in a gated cell and the cell makes decisions to store or not store, remembers values over time intervals. The gates of the cell regulate the flow of information into and out of the cell. Other and different model architecture can be used. For example, different types of recurrent neural network models, different types of neural network models, different types of deep learning neural network models can be used. Yet in other aspects, different types of artificial intelligence models can be used.

Figure 6:
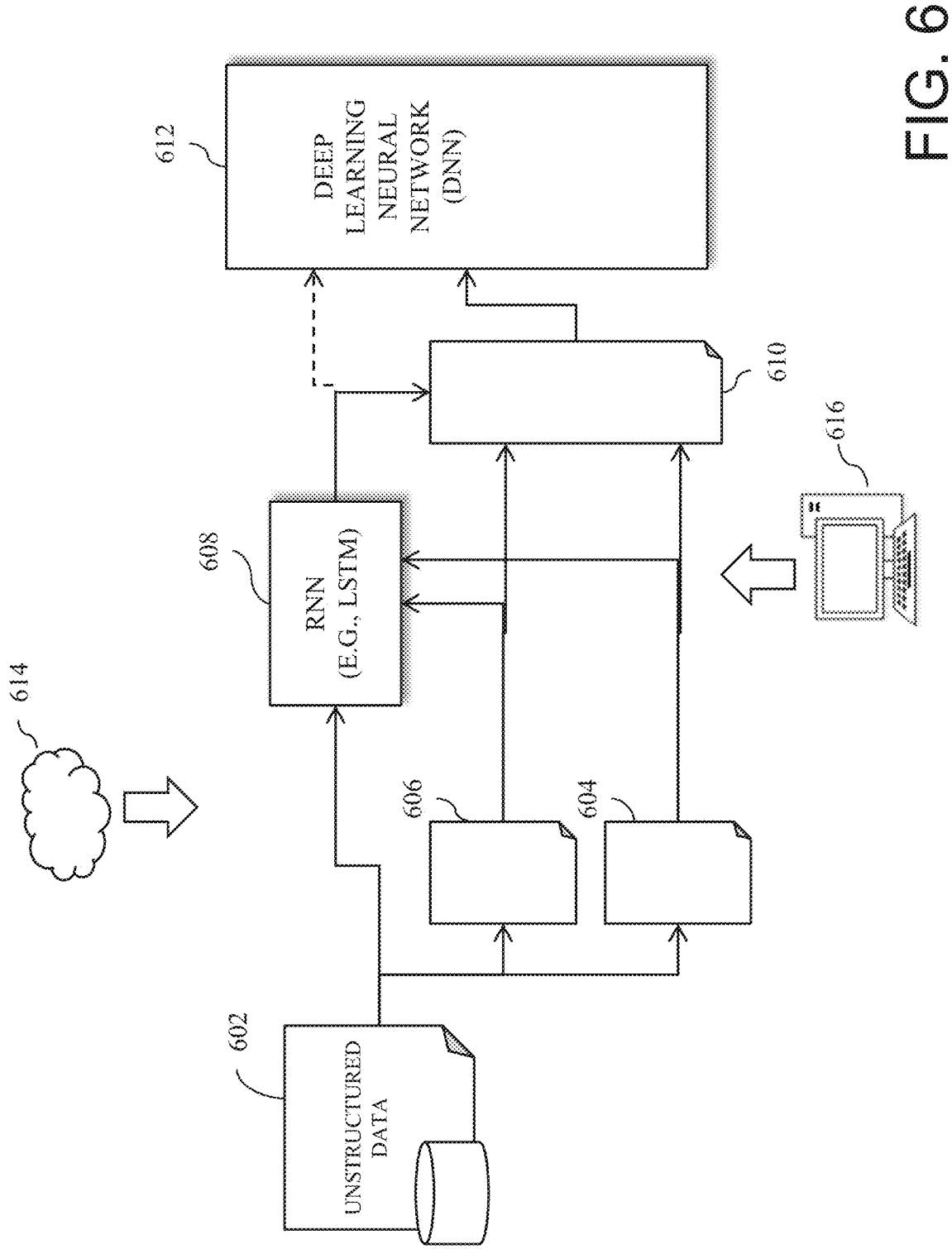
FIG. 6 is a diagram illustrating components of a computer system or computing device, which can train a neural network to automatically identify one or more hypernyms given unstructured text in an embodiment.

FIG. 6 is a diagram illustrating components of a computer system or computing device, which can train a neural network to automatically identify one or more hypernyms from unstructured text in an embodiment. The computer processor 616, for example, may implement the components shown. In another aspect, a cloud-based system 614 may implement the components. The components shown include computer-implemented components, for instance, implemented and/or run on one or more hardware processors, or coupled with one or more hardware processors. One or more hardware processors, for example, may include components such as programmable logic devices, microcontrollers, memory devices, and/or other hardware components, which may be configured to perform respective tasks described in the present disclosure. Coupled memory devices may be configured to selectively store instructions executable by one or more hardware processors. A processor may be a central processing unit (CPU), a graphics processing unit (GPU), a field programmable gate array (FPGA), an application specific integrated circuit (ASIC), another suitable processing component or device, or one or more combinations thereof. The processor may be coupled with a memory device. The memory device may include random access memory (RAM), read-only memory (ROM) or another memory device, and may store data and/or processor instructions for implementing various functionalities associated with the methods and/or systems described herein. The processor may execute computer instructions stored in the memory or received from another computer device or medium.

A processor, for example, 614 and/or 616, may receive a corpus of electronic text, for example, unstructured data 602. The processor may parse the data 602 and create a preliminary candidate list of hyponym-hypernym pairs 604 from the corpus. The processor may also generate a preliminary super-term—sub-term glossary 606 from the corpus. The preliminary super-term—sub-term glossary 606 contains one or more super-term—sub-term pairs extracted from the data 602. Linguistic pattern processing and/or natural language processing techniques can be used to extract the pairs. The processor may also remove or filter out one or more super-term—sub-term pairs from the preliminary super-term—sub-term glossary, which cannot be hypernym-hyponym, determined using, for example, one or more validity checking or filtering techniques. The processor may combine the preliminary candidate list of hyponym-hypernym pairs 604 and the super-term—sub-term glossary 606 and generate an updated list of hyponym-hypernym pairs.

The processor may also train a sequence-to-sequence an artificial neural network, for example, an LSTM, 608 using a combined hyponym-hypernym pair list (combination of the hyponym-hypernym pairs 604 and the super-term—sub-term pairs 606) as a training data set. The sequence-to-sequence an artificial neural network 608 learns a hypernym sub-term from a hyponym super-term. The processor may also apply noun phrases extracted from the corpus 602 to the sequence-to-sequence artificial neural network 608 to infer additional one or more new hyponym-hypernym pairs, not already in the combined list. The processor may add one or more new inferred hyponym-hypernym pairs to the combined hyponym-hypernym pair list. An updated hyponym-hypernym pair list 610 is used as training data to train a deep learning neural network 612 to learn to identify one or more hypernyms given new data, for example, unseen data.

Figure 7:
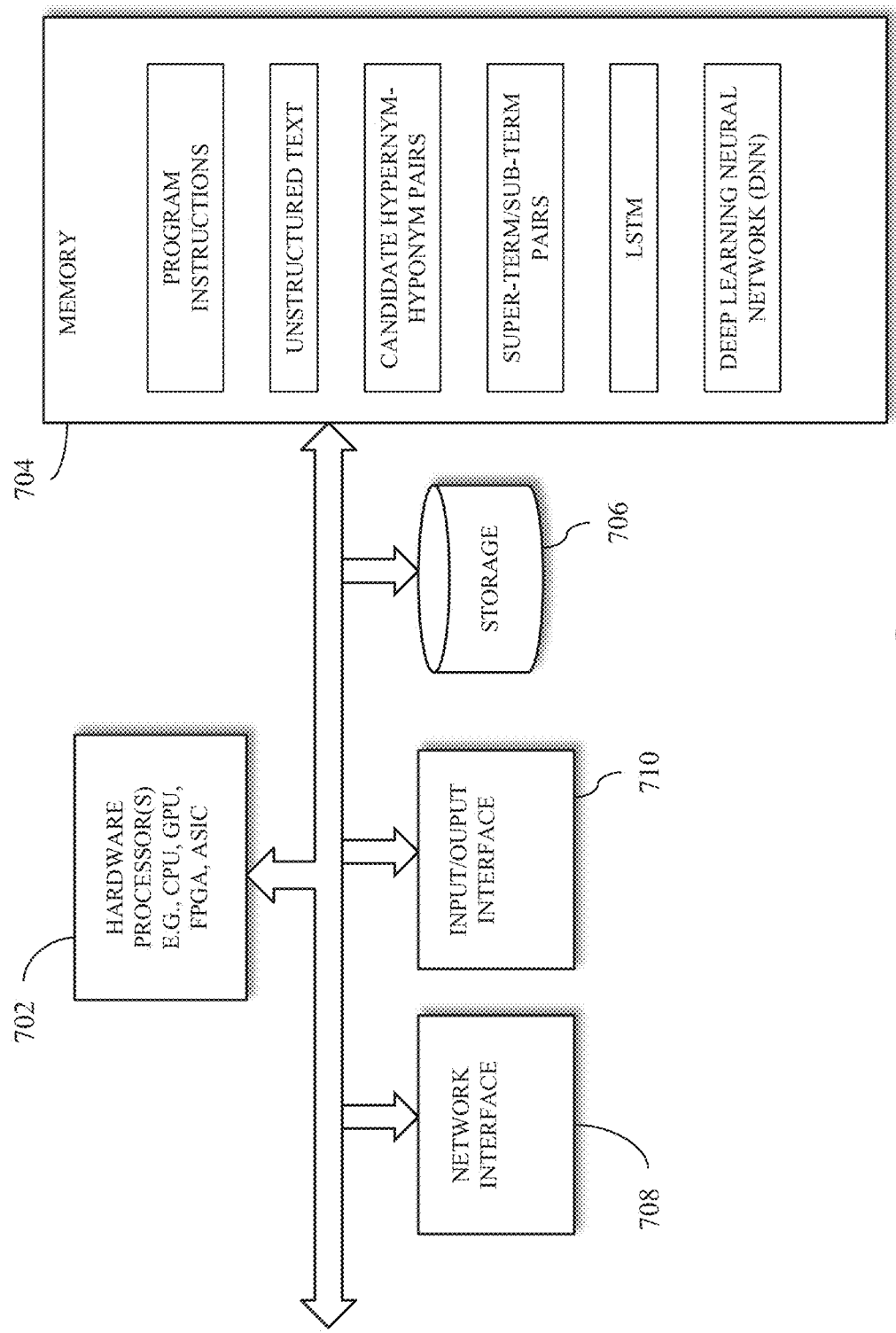
FIG. 7 is another diagram showing components of a system in an embodiment, which can train a neural network to automatically identify one or more hypernyms from unstructured text in an embodiment.

FIG. 7 is another diagram showing components of a system in an embodiment, which can train a neural network to automatically identify one or more hypernyms from unstructured text in an embodiment. One or more hardware processors 702 such as a central processing unit (CPU), a graphic process unit (GPU), and/or a Field Programmable Gate Array (FPGA), an application specific integrated circuit (ASIC), and/or another processor, may be coupled with a memory device 704, and generate a neural network model and identify one or more hypernyms from unstructured text in an embodiment. A memory device 704 may include random access memory (RAM), read-only memory (ROM) or another memory device, and may store data and/or processor instructions for implementing various functionalities associated with the methods and/or systems described herein. One or more processors 702 may execute computer instructions stored in memory 704 or received from another computer device or medium. A memory device 704 may, for example, store instructions and/or data for functioning of one or more hardware processors 702, and may include an operating system and other program of instructions and/or data. One or more hardware processors 702 may receive input comprising unstructured text data. For instance, at least one hardware processor 702 may generate a machine learning model, e.g., a neural network that identifies or classifies one or more hypernyms from given data. In one aspect, input data may be stored in a storage device 706 or received via a network interface 708 from a remote device, and may be temporarily loaded into a memory device 704 for building or generating the model. The learned model may be stored on a memory device 704, for example, for execution by one or more hardware processors 702. One or more hardware processors 702 may be coupled with interface devices such as a network interface 708 for communicating with remote systems, for example, via a network, and an input/output interface 710 for communicating with input and/or output devices such as a keyboard, mouse, display, and/or others.

Figure 8:
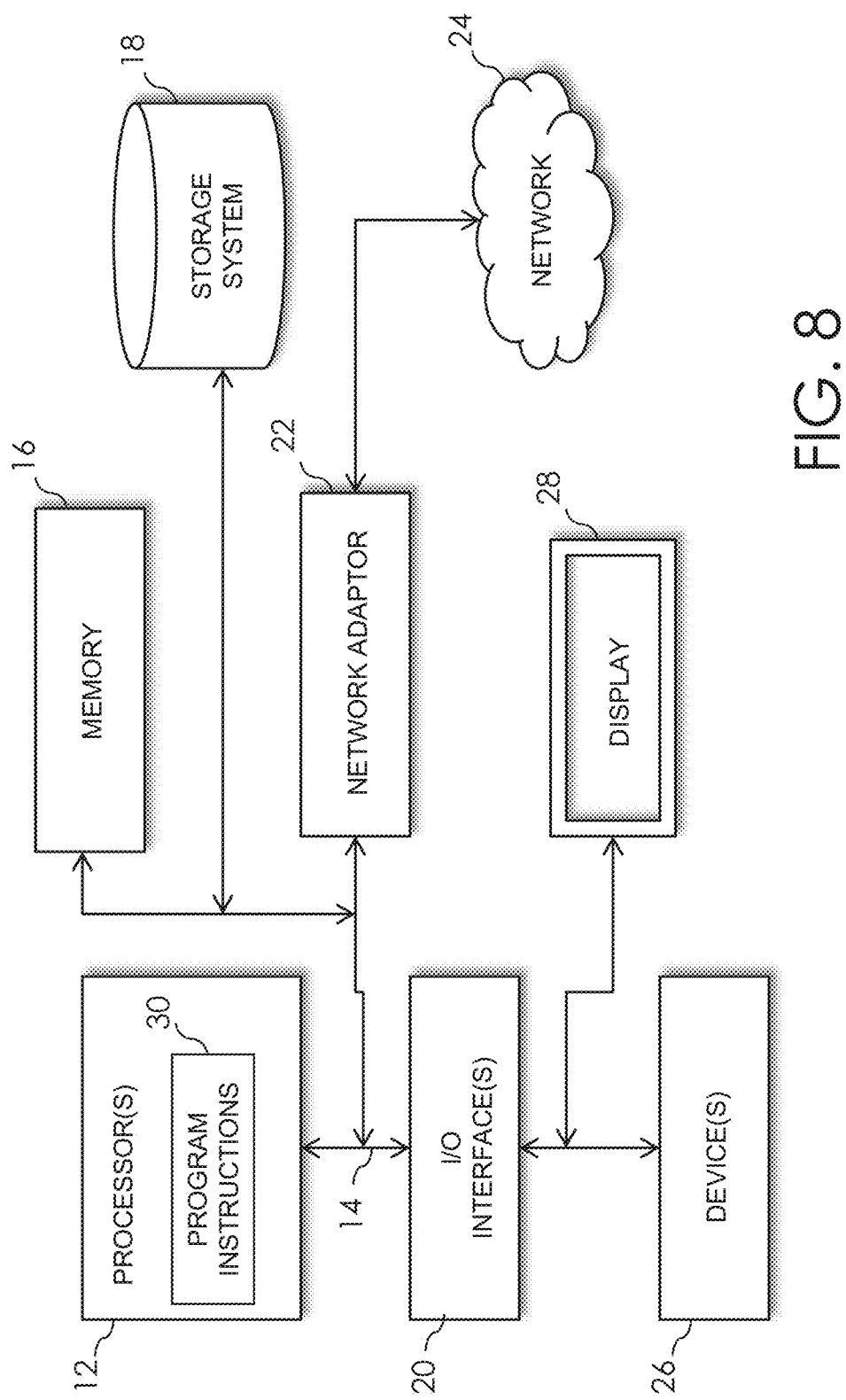
FIG. 8 illustrates a schematic of an example computer or processing system that may implement a system in an embodiment.

FIG. 8 illustrates a schematic of an example computer or processing system that may implement a system in an embodiment. The computer system is only one example of a suitable processing system and is not intended to suggest any limitation as to the scope of use or functionality of embodiments of the methodology described herein. The processing system shown may be operational with numerous other general purpose or special purpose computing system environments or configurations. Examples of well-known computing systems, environments, and/or configurations that may be suitable for use with the processing system shown in FIG. 8 may include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer system may be described in the general context of computer system executable instructions, such as program modules, being executed by a computer system. Generally, program modules may include routines, programs, objects, components, logic, data structures, and so on that perform particular tasks or implement particular abstract data types. The computer system may be practiced in distributed cloud computing environments where tasks are performed by remote processing devices that are linked through a communications network. In a distributed cloud computing environment, program modules may be located in both local and remote computer system storage media including memory storage devices.

The components of computer system may include, but are not limited to, one or more processors or processing units 12, a system memory 16, and a bus 14 that couples various system components including system memory 16 to processor 12. The processor 12 may include a module 30 that performs the methods described herein. The module 30 may be programmed into the integrated circuits of the processor 12, or loaded from memory 16, storage device 18, or network 24 or combinations thereof.

Bus 14 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system may include a variety of computer system readable media. Such media may be any available media that is accessible by computer system, and it may include both volatile and non-volatile media, removable and non-removable media.

System memory 16 can include computer system readable media in the form of volatile memory, such as random access memory (RAM) and/or cache memory or others. Computer system may further include other removable/non-removable, volatile/non-volatile computer system storage media. By way of example only, storage system 18 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 14 by one or more data media interfaces.

Computer system may also communicate with one or more external devices 26 such as a keyboard, a pointing device, a display 28, etc.; one or more devices that enable a user to interact with computer system; and/or any devices (e.g., network card, modem, etc.) that enable computer system to communicate with one or more other computing devices. Such communication can occur via Input/Output (I/O) interfaces 20.

Still yet, computer system can communicate with one or more networks 24 such as a local area network (LAN), a general wide area network (WAN), and/or a public network (e.g., the Internet) via network adapter 22. As depicted, network adapter 22 communicates with the other components of computer system via bus 14. It should be understood that although not shown, other hardware and/or software components could be used in conjunction with computer system. Examples include, but are not limited to: microcode, device drivers, redundant processing units, external disk drive arrays, RAID systems, tape drives, and data archival storage systems, etc.

It is understood in advance that although this disclosure may include a description on cloud computing, implementation of the teachings recited herein are not limited to a cloud computing environment. Rather, embodiments of the present invention are capable of being implemented in conjunction with any other type of computing environment now known or later developed. Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 9:
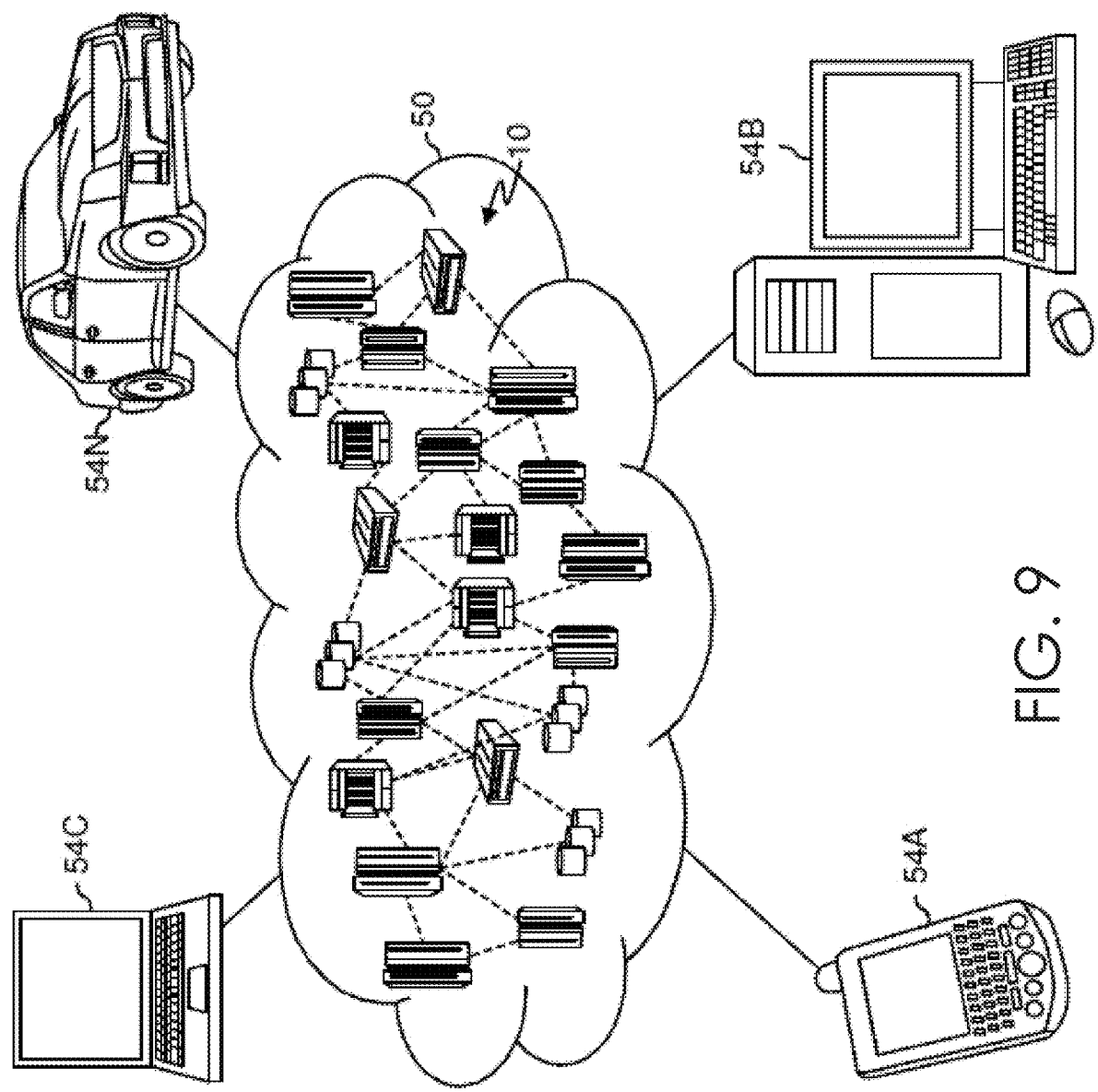
FIG. 9 illustrates a cloud computing environment in one embodiment.

Referring now to FIG. 9, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 9 are intended to be illustrative only and that computing nodes 10 and cloud computing environment 50 can communicate with any type of computerized device over any type of network and/or network addressable connection (e.g., using a web browser).

Figure 10:
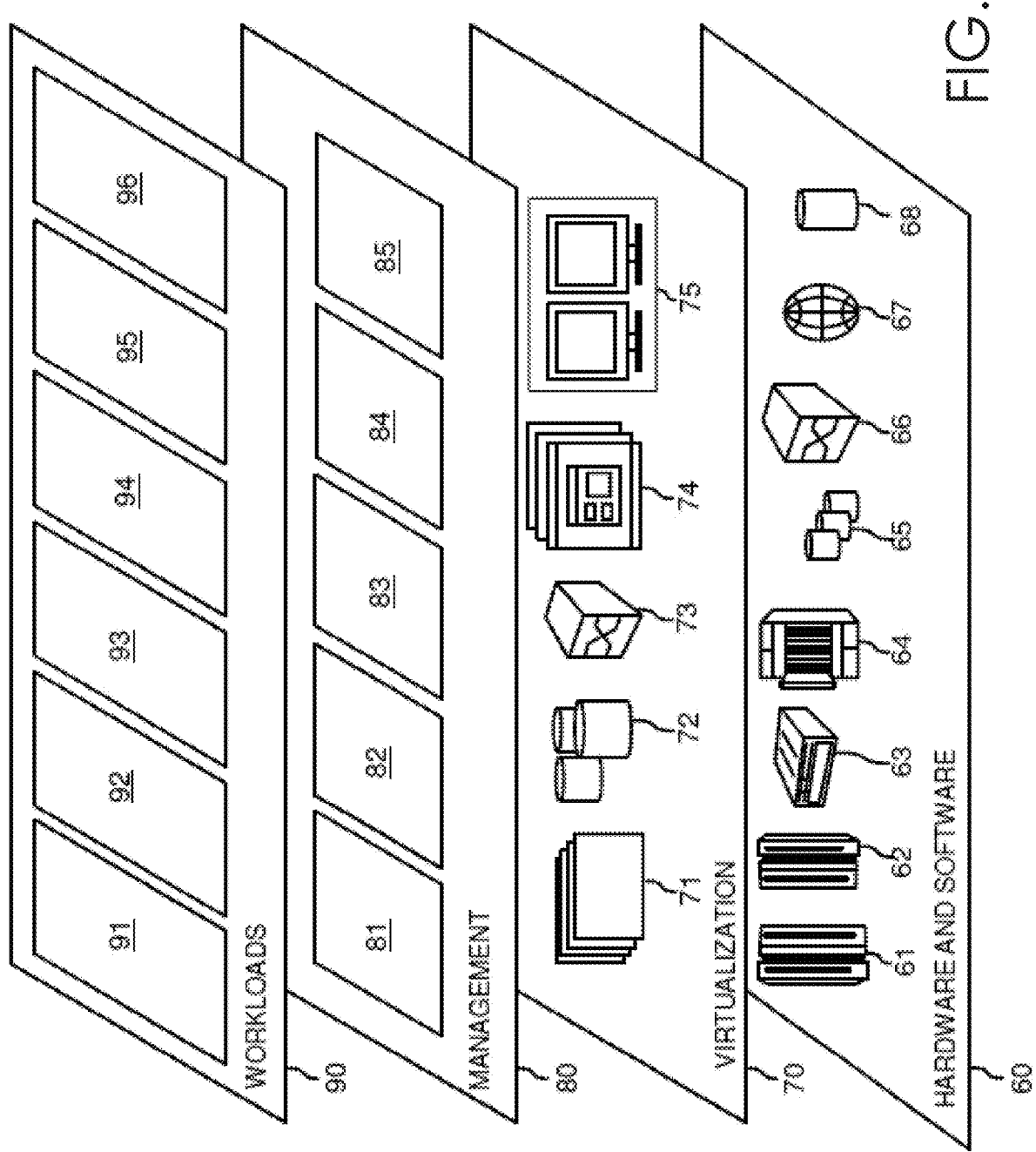
FIG. 10 illustrates a set of functional abstraction layers provided by cloud computing environment in one embodiment of the present disclosure.

Referring now to FIG. 10, a set of functional abstraction layers provided by cloud computing environment 50 (FIG. 9) is shown. It should be understood in advance that the components, layers, and functions shown in FIG. 10 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and hypernym extraction model processing 96.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. As used herein, the term "or" is an inclusive operator and can mean "and/or", unless the context explicitly or clearly indicates otherwise. It will be further understood that the terms "comprise", "comprises", "comprising", "include", "includes", "including", and/or "having," when used herein, can specify the presence of stated features, integers, steps, operations, elements, and/or components, but do not preclude the presence or addition of one or more other features, integers, steps, operations, elements, components, and/or groups thereof. As used herein, the phrase "in an embodiment" does not necessarily refer to the same embodiment, although it may. As used herein, the phrase "in one embodiment" does not necessarily refer to the same embodiment, although it may. As used herein, the phrase "in another embodiment" does not necessarily refer to a different embodiment, although it may. Further, embodiments and/or components of embodiments can be freely combined with each other unless they are mutually exclusive.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

We claim:

1. A computer-implemented method comprising:
   receiving a corpus of electronic text;
   parsing a preliminary candidate list of hyponym-hypernym pairs from the corpus;
   generating a preliminary super-term—sub-term glossary from the corpus, the preliminary super-term—sub-term glossary containing one or more super-term—sub-term pairs;
   filtering out a super-term—sub-term pair from the preliminary super-term—sub-term glossary, responsive to detecting that the super-term—sub-term pair is not a candidate for hyponym-hypernym pair, to generate a final super-term—sub-term glossary;
   combining the preliminary candidate list of hyponym-hypernym pairs and the final super-term—sub-term glossary to generate a final list of hyponym-hypernym pairs;
   performing a transitive closure technique on at least the final list of hyponym-hypernym pairs to extract at least one additional hyponym-hypernym pair; and
   adding the extracted at least one additional hyponym-hypernym pair to the final list of hyponym-hypernym pairs; and
   training an artificial neural network using the final list of hyponym-hypernym pairs as a training data set, the artificial neural network trained to identify a hypernym given a new electronic text.

2. The method of claim 1, wherein the electronic text is unstructured text data.

3. Method of claim 1, wherein a linguistic pattern matching technique is performed to identify the preliminary candidate list of hyponym-hypernym pairs in the electronic text.

4. The method of claim 1, wherein a linguistic pattern matching technique is performed to generate the preliminary super-term—sub-term glossary from the corpus containing one or more super-term—sub-term pairs.

5. The method of claim 1, wherein
   the performing a transitive closure technique includes performing a transitive closure technique on the final super-term—sub-term glossary and the final list of hyponym-hypernym pairs to extract at least one additional hyponym-hypernym pair.

6. The method of claim 1, further including training a sequence-to-sequence artificial neural network using the final list of hyponym-hypernym pairs as a training data set to learn a hypernym sub-term from a hyponym super-term.

7. The method of claim 6, wherein the sequence-to-sequence artificial neural network is a long short term memory (LSTM).

8. The method of claim 6, further including applying noun phrases extracted from the corpus to the trained sequence-to-sequence artificial neural network to infer at least one new hyponym-hypernym pair, not in the final list of hyponym-hypernym pairs.

9. The method of claim 8, further including updating the final list of hyponym-hypernym pairs with addition of the new inferred hyponym-hypernym pair.

10. The method of claim 1, further including running the artificial neural network in inference phase to identify a hypernym given a new electronic text.

11. A computer program product comprising a computer readable storage medium having program instructions embodied therewith, the program instructions executable by a device to cause the device to:
    receive a corpus of electronic text;
    parse a preliminary candidate list of hyponym-hypernym pairs from the corpus;
    generate a preliminary super-term—sub-term glossary from the corpus, the preliminary super-term—sub-term glossary containing one or more super-term—sub-term pairs;
    filter out a super-term—sub-term pair from the preliminary super-term—sub-term glossary, responsive to detecting that the super-term—sub-term pair is not a candidate for hyponym-hypernym pair, to generate a final super-term—sub-term glossary;
    combine the preliminary candidate list of hyponym-hypernym pairs and the final super-term—sub-term glossary to generate a final list of hyponym-hypernym pairs;
    perform a transitive closure technique on at least the final list of hyponym-hypernym pairs to extract at least one additional hyponym-hypernym pair, wherein the extracted at least one additional hyponym-hypernym pair is added to the final list of hyponym-hypernym pairs; and
    train an artificial neural network using the final list of hyponym-hypernym pairs as a training data set, the artificial neural network trained to identify a hypernym given a new electronic text.

12. The computer program product of claim 11, wherein the electronic text is unstructured text data.

13. The computer program product of claim 11, wherein the device caused to perform a transitive closure technique includes the device caused to perform a transitive closure technique on the final super-term—sub-term glossary and the final list of hyponym-hypernym pairs.

14. The computer program product of claim 11, wherein the device is further caused to train a sequence-to-sequence artificial neural network using the final list of hyponym-hypernym pairs as a training data set to learn a hypernym sub-term from a hyponym super-term.

15. The computer program product of claim 14, wherein the sequence-to-sequence artificial neural network is a long short term memory (LSTM).

16. The computer program product of claim 14, the device is further caused to apply noun phrases extracted from the corpus to the sequence-to-sequence artificial neural network to infer at least one new hyponym-hypernym pair, not in the final list of hyponym-hypernym pairs.

17. The computer program product of claim 16, wherein the final list of hyponym-hypernym pairs are updated with addition of the new inferred hyponym-hypernym pair.

18. The computer program product of claim 11, wherein the device is further caused to run the artificial neural network in inference phase to identify a hypernym given a new electronic text.

19. A system comprising:
a hardware processor;
a memory device coupled with the hardware processor;
the hardware processor configured to at least:
  receive a corpus of electronic text;
  parse a preliminary candidate list of hyponym-hypernym pairs from the corpus;
  generate a preliminary super-term—sub-term glossary from the corpus, the preliminary super-term—sub-term glossary containing one or more super-term—sub-term pairs;
  filter out a super-term—sub-term pair from the preliminary super-term—sub-term glossary, responsive to detecting that the super-term—sub-term pair is not a candidate for hyponym-hypernym pair, to generate a final super-term—sub-term glossary;
  combine the preliminary candidate list of hyponym-hypernym pairs and the final super-term—sub-term glossary to generate a final list of hyponym-hypernym pairs; and
  train an artificial neural network using the final list of hyponym-hypernym pairs as a training data set, the artificial neural network trained to identify a hypernym given a new electronic text,
wherein the hardware processor is further configured to train a sequence-to-sequence artificial neural network using the final list of hyponym-hypernym pairs as a training data set to learn a hypernym sub-term from a hyponym super-term, and apply noun phrases extracted from the corpus to the sequence-to-sequence artificial neural network to infer at least one new hyponym-hypernym pair, not in the final list of hyponym-hypernym pairs.

20. The system of claim 19, wherein the hardware processor is further configured to:
update the final list of hyponym-hypernym pairs with addition of the new inferred hyponym-hypernym pair.

* * * * *